Dec. 8, 1953 N. H. POLSKY 2,661,733
MEASURING DEVICE SUITABLE FOR DIAGNOSTIC PURPOSES
Filed Oct. 25, 1951 2 Sheets-Sheet 2
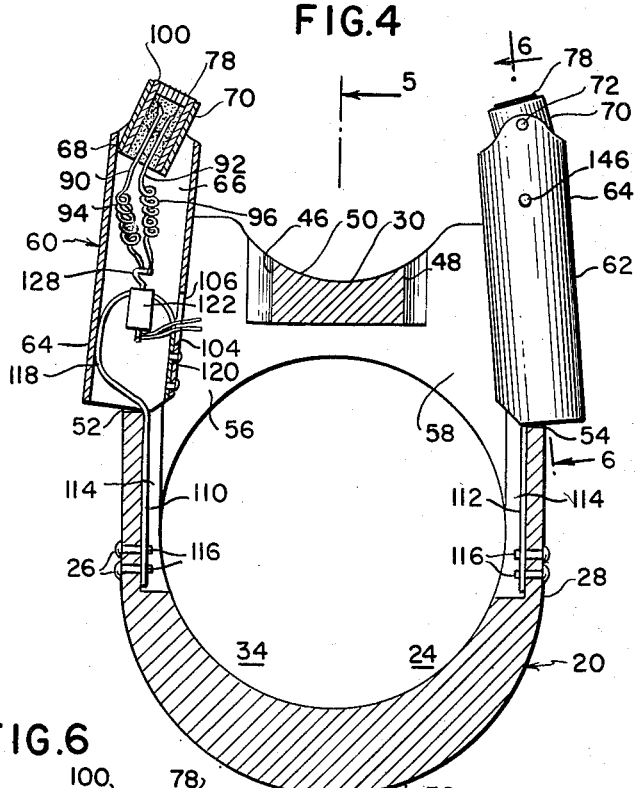
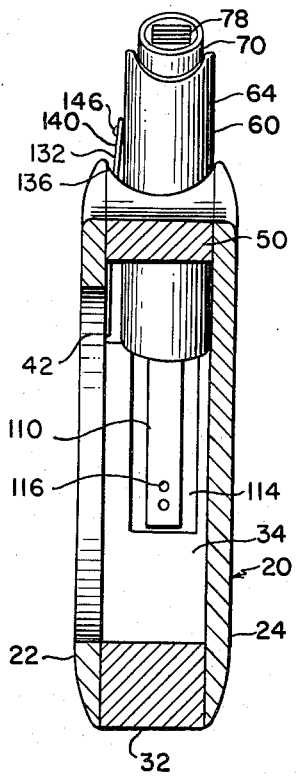
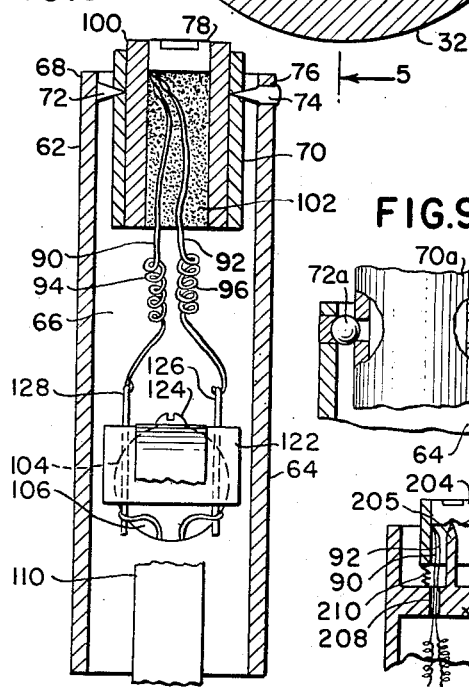
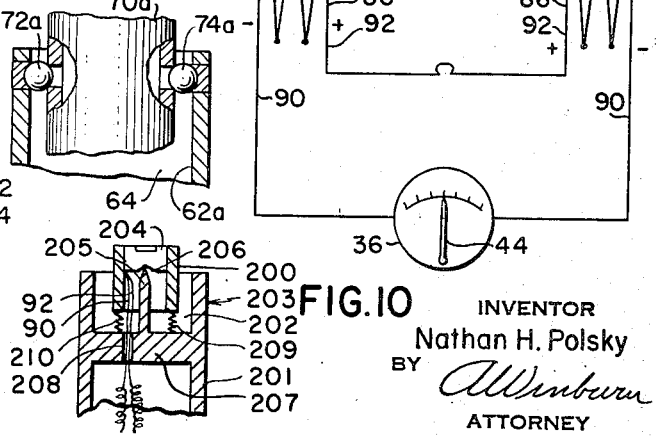
INVENTOR
Nathan H. Polsky
BY
*Al Winburn*
ATTORNEY Patented Dec. 8, 1953

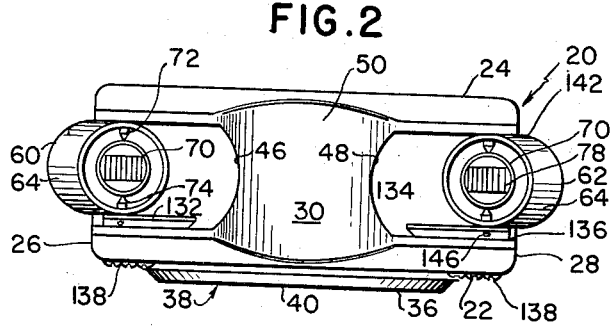

2,661,733

UNITED STATES PATENT OFFICE 2,661,733

MEASURING DEVICE SUITABLE FOR DIAGNOSTIC PURPOSES

Nathan H. Polsky, Levittown, N. Y.

Application October 25, 1951, Serial No. 253,071

9 Claims. (Cl. 128—2)

This invention relates generally to measuring devices suitable for diagnostic or similar purposes.

One of the objects of my invention is to provide a device of the character described having at least one probe or detector member adapted to contactively engage a selected surface of the skin of a patient which it is desired to explore for the purpose of diagnosis, in which novel means are employed for mounting said detector member whereby it will automatically adjust itself to variations in contour of the surface explored.

Another object of my invention is to provide a device of the character described adapted for use as a diagnostic instrument by chiropractors, osteopathic physicians and others, having probe members spaced apart a predetermined distance for locating and measuring points of heat unbalance or temperature differential on or about selected areas of the body, particularly those areas related to the spine and nervous system, in which each probe member will independently maintain good contact with a selected body area regardless of the differences and irregularities of the surface contour of said selected areas.

Still another object of my invention is to provide a diagnostic and/or measuring device of the class described, having a pair of spaced probes, in which novel and improved means are provided for controlling and regulating the spacing between the probes, so that the same device may be adapted for use both with adults and children.

A further object of my invention is to provide a diagnostic or measuring device of the character described which shall comprise relatively few and simple parts, which shall be easy to use, while being highly precise and which shall represent a general improvement in the art.

These and other objects and advantages of the invention will become apparent from the following description of a preferred embodiment thereof as illustrated in the accompanying drawings, forming a part hereof, and in which, Fig. 1 is a plan view showing a novel and improved diagnostic and/or measuring device constructed and arranged in accordance with my invention and illustrating the manner of its use in connection with the body of a patient;

Fig. 2 is a top plan view of the device shown in Fig. 1, apart from the patient's body;

Fig. 3 is a right hand elevational view of the device shown in Fig. 1;

Fig. 4 is a cross-sectional view taken substantially on plane 4—4 of Fig. 3, one of the probe units being shown sectioned whereas the other probe unit is shown in elevation, for illustrative purposes;

Fig. 5 is a cross-sectional view taken substantially on plane 5—5 of Fig. 4;

Fig. 6 is an enlarged cross-sectional view taken substantially on plane 6—6 of Fig. 4, that is to say, through one of the probe units;

Fig. 7 is a perspective view of one of the thermocouple devices carried by the probe units of Fig. 1, the thermocouple being shown apart from the surrounding supporting housings;

Fig. 8 is a schematic diagram showing the circuit in which two thermocouples and an indicating or recording instrument are connected;

Fig. 9 is a fragmentary cross-sectional view similar to that of Fig. 6, but showing a modified form of arrangement for mounting the detector housings; and Fig. 10 is a view similar to Fig. 9, but illustrating a universal form of mounting for the detector housing.

For the purposes of illustration and clarification, I shall describe my invention as employed in connection with the diagnostic work of the chiropractor, osteopathic physician and others, it being understood that my device may be satisfactorily put to other desired uses.

It frequently becomes important for the chiropractor, physician, or others to determine whether certain paired locations about the body, which should normally be at substantially the same temperature, are in fact at different temperatures. In checking spinal subluxations and temperatures along the spinal column an instrument of reliable accuracy and sensitivity is required. It is necessary to adjust the instrument probes or detectors in their mutual spacing, so that they will conform not only to the spinal breadth, so that differentiation may be arranged in the spacing of the probes when employing them upon a child, as contrasted to use upon an adult, but also to the shape and curvature of the body and skin surface. The probes and their temperature sensitive elements should glide smoothly over the body, and adjust themselves so as to lie directly against the skin, and in full contact therewith, for maximum efficiency and accuracy.

All these advantages are provided by the use of my novel device. In order to understand clearly the nature of my invention, and the best means for carrying it out, reference may now be had to the drawings, in which like numerals denote similar parts throughout the several views.

As shown, there is a main instrument housing 20 which may comprise front and rear walls 22 and 24, walls 26 and 28, and top and bottom walls 30 and 32, defining an interior housing chamber 34. As shown in Figs. 1 and 3, the chamber 34 may be rounded somewhat, to provide a seat for receiving the case of a suitable recording or measuring device, such as, for example a galvanometer instrument 36, the dial 38 of which is visible through the cover glass 40 thereof, an opening 42 being formed through front wall 22 of the main housing, to receive the instrument. The instrument 36 may have its dial graduated in any suitable manner, and preferably on both sides of a central null or zero point, so that the needle 44 of the galvanometer will come to rest at the null point shown in full lines in Fig. 1, when no current is flowing through the coils of the galvanometer.

As seen in Figs. 3 and 5, the chamber 34 may have substantial thickness, so that the instrument body can be accommodated therein, and also, to fit comfortably in the hand of the user. As seen in the drawings, the left and right side portions of the top wall 30 are cut away, to the left of curved line 46 and to the right of curved line 48 as seen best in Fig. 2, leaving only a web 50 thereat. At the same time, the upper portions of the left and right end walls 26 and 28 of the main housing are cut away above lines or locations 52 and 54, and thus exposing openings 56 and 58 communicating with the interior chamber 34 of the main housing. In these two openings 56 and 58, I support the two probe or detector units 60 and 62. These two probe units 60 and 62 are alike, except that they are oppositely oriented, and Fig. 6 shows how both are otherwise constructed.

Each probe unit, such as 62, thus includes a main probe housing 64 formed of suitable material, such as metal, in the form of a hollow cylinder, having an axial bore 66. At the top end 68, a cylindrical thermocouple unit housing 70 is disposed with a portion extending down inside the bore 66, a pair of inwardly oriented trunnions 72 and 74 having their inner ends penetrating into opposite sides of the housing 70 so as to support the same for pivotal motion about the common axis of the trunnions 72 and 74. The trunnions are carried into the housing 64, and may be integral with the housing 64, or pressed into position through openings such as at 76 formed in the housing walls on opposite sides thereof.

A thermocouple base or block 78 may be formed of suitable insulating material, such as glass, plastic, ceramic, or the like, of light weight, and may have an upper groove 80 formed in its upper surface 82. A number of thermocouples, formed of pairs of electrical conductors such as 84 and 86 of dissimilar metals welded together at the thermocouple joint 88, are disposed as shown in Fig. 7, with their thermocouple joints 88 allowed to depend or yield upon pressure into the groove 80, being stretched thereacross. The several thermocouples are all interconnected as shown, so that the cumulative electromotive force of all forms the resultant voltage available across the two output terminals 90 and 92 of a single thermocouple unit.

The wires 90 and 92 are led through fine interconnecting spirals 94 and 96 which are very flexible to interfere as little as possible with free pivotal movement of the housing 70, and are interconnected with the instrument 36 and with each other in the manner shown in Fig. 8, so that their respective voltages are in opposition, that is to say, the positive leads 92 are interconnected, and the negative leads 90 are interconnected through the highly sensitive galvanometer 36. It will be understood that when the induced voltage in the right hand thermocouple unit of Fig. 8 exceeds that of the left hand thermocouple unit, current will flow to the left hand thermocouple unit through the galvanometer, and the needle will swing to the right indicating that the right hand thermal unit is hotter than the left hand unit. Similarly, when the left hand thermal unit is hotter, by virtue of being in contact with a hotter area of the body, then the current will flow to the right, and the needle will swing to the left. The deflection of the needle will depend upon the constants and sensitivity of the galvanometer, this being a matter of choice.

The heat sensitive thermocouple block 78 may be seated in a filler of suitable materials such as insulating ceramic material 100, which allows the upper surface 82 to be exposed, together with all the thermocouple junctions 88 for direct contact with the skin of the patient. The filler material 100 may engage the inner surface of the cylindrical housing 70 in any suitable manner, so that the thermocouple block is movable only with the housing 70, and the space at the lower end of the housing 70 may be filled with the same or other suitable filler material such as at 102, allowing the lead wires 90 and 92 to penetrate the same, however, as shown in Figs. 4 and 6.

An opening is formed in the side wall of the housing 64, as at 104, to allow the wires 90 and 92 to be conducted into the interior chamber 34 of the main housing, and a cover plate 106 may be secured over such openings, the plate 106 having smaller openings to allow the wires 90 and 92 to extend therethrough, and being secured over the openings in any suitable manner. Flexible bracket strips 110 and 112 are secured at their lower end portions to the inner surface 114 of the walls 26 and 28 respectively, by means of screws 116, the upper goosenecked portions 118 of the strips 110 and 112 extend upwardly inside the lower portions of the cylinders 62 and 64, being secured thereto by means of screws 120 penetrating both the outer portions of the goosenecks 118 and the wall of the cylinders 62 and 64. The goosenecks, being somewhat flexible, also are frictionally held in position, since they will be made so that the goosenecks are somewhat larger normally than the inside diameter of the housings 62 and 64 and must be pushed inside.

Each gooseneck 118 has an insulating terminal block 122 secured thereto transversely under the arch of the gooseneck by means of the screw 124, and has transit bus connectors 126 and 128 which are connected in the wires 90 and 92, allowing the electrical connection through the terminal block 122 without any wear on the wires. It is thus seen that each of the housings 60 and 62 is mounted resiliently in substantially upright position, being supported by the flexible metal brackets 114 as described, in the openings 56 and 58 of the main housing and so as to project above the upper surface thereof in the manner of Figs. 1 and 2.

It is thus seen from the above described construction that if the probe swivels are in the vertical plane and the probes are moved in the vertical plane, they will automatically follow the changing contours of the horizontal plane and thus provide good surface contact. If the detectors are turned and mounted in a position whereby the swivels are in the horizontal plane, and the detectors are moved in the horizontal plane, then the detectors will automatically adjust and revolve themselves about the swivel axis to insure good contact with any irregularly curved surface in the vertical plane. The temperature differential between two spaced locations on the body surface 130 of the patient, as in the region of the spinal column, can thus be readily determined.

I also provide a pair of fixed positioning plates 132 and 134, secured respectively to the inner wall surfaces 136 of the openings 56 and 58 of the main housing, by means of screws 138, and having resiliently bent-in upper portions 140, which bear against the side surface of each of the cylindrical housings 60 and 62, so as to press them against the rear surface 142 of the openings 56 and 58. The pressure and positioning plates 132 and 134 are provided with a series of arcuately laid out positioning holes 144 to receive the small positioning projection or pin 146 which projects out of and is movable with each of the cylinders 60 and 62 as shown. Thus, by pressing the plates 132 and 134 away from the cylinders 60 and 62, their locating pins 146 are disengaged from the particular positioning hole 144 shown, and then the cylinders may be moved so as to register their pin 146 with any other desired opening 144 and for engagement therewith, so that the spacing between the heat responsive housings 70 may be varied in any desired fineness of graduated steps, and hence the device may be accommodated to adults or children, for diagnostic work thereon. Further, since the thermal heads 70 are supported so flexibly, being pivoted on pins 72 as shown, they will have their upper contact surfaces 160 constantly turning to present their full contact areas of their thermocouples against the skin, regardless of variations of contour of the body.

In Figs. 9 and 10 I have illustrated modified forms for mounting the detector housings 70.

In Fig. 9, it is seen that instead of using the conical inwardly pointed trunnions as shown at 72 and 74 of Fig. 6, I may make them rounded or spherical as at 72a and 74a and secured to the inner surface of the housings such as 62a, corresponding to 62 and 60 of Fig. 6, and form rounded or spherical sockets on the outer surfaces of the thermal unit housings 70a, corresponding to 70 of Fig. 6, for smooth pivotal support.

In the Fig. 10 form of my invention I provide an automatic universal adjustment of the detector housings 70 whereby they will contactively engage selected body surfaces under probe regardless of the differences and variations in contour of the said body surfaces. Further, since the housings are independently supported, each detector unit will make its own automatic adjustment as it is moved over or placed against selected body areas. To this end I provide a detector unit 204 (which in this case is the thermocouple) in a housing comprising a tubular member 200 open at the top and bottom, and having the thermocouple member 204 seated at the uppermost end of the tubular member 200, similar to the mounting of the member 78 in the unit 70. As shown in Fig. 10, the undersurface of the member 204 is provided with a detent or socket area 206, which receives therein the upper pointed end of a stem 205, forming part of and extending from a web 207 formed in the probe housing 201, the said housing 201 being otherwise similar to that of the housing 64 in purpose and function. It is thus noted that the tubular member 200 carrying the detector unit 204 will be free to tilt in any direction to thereby permit automatic adjustment of the detector unit 204 with respect to any irregularities of the body surface with which it is placed in contact. To maintain the detent 204 in contact with the point of the stem 205 and at the same time to restore the member 200 to its normal level position, I provide springs 209 interconnecting the lower edge of the member 200 with the web 207. An aperture 208 is provided in the web 207 to permit the free passage of the wires 90 and 92 as shown.

While I have described my invention in specific terms, it will be understood that various changes may be made in size, shape, materials and arrangement without departing from the spirit and scope of the invention.

I claim:

1. A device of the character described comprising a first detector unit and a second detector unit spaced from said first detector unit a predetermined distance and adapted to overlie the surface of the skin of selected areas of the body of a patient, a main support, a first auxiliary support and a second auxiliary support, means for mounting said first detector unit on said first auxiliary support for pivotal movement with respect thereto and means for mounting said second detector unit on said second auxiliary support for pivotal movement with respect thereto whereby each detector unit may independently automatically pivotally adjust itself to irregularities in the contour of said selected body areas under examination, and means for mounting said first and second auxiliary supports on said main support in predetermined angular relationship with respect to each other, said last named means including means for manually altering said predetermined angular relationship between said first and second detector units to thereby alter the said predetermined spaced distance between said detector units.

2. A device according to claim 1 in which means are provided for maintaining said first and second auxiliary supports in said altered relative angular relationship.

3. A device according to claim 2 in which the means for mounting each auxiliary support on said main support comprises a resilient member interconnecting said auxiliary support with said main support.

4. A device according to claim 3 in which there is provided indicating means and means for operatively connecting said first and second detector units to said recording means.

5. A device according to claim 4 in which said indicating means is carried by said main support.

6. A device according to claim 5 in which the means for maintaining said auxiliary supports in altered relative angular relationship comprises a plurality of locating openings formed in said main support and locating pins carried by each of said auxiliary supports and adapted for engagement with any selected locating opening.

7. A device of the character described comprising a detector unit, said detector unit being adapted to overlie the surface of the skin of selected areas of the body of a patient, a main support, an auxiliary support, means for mounting said detector unit on said auxiliary support for pivotal movement with respect thereto; whereby said detector unit may automatically pivotally adjust itself to irregularities in the contour of said selected body areas under examination, and means for mounting said auxiliary support on said main support in predetermined angular relationship.

8. A device, according to claim 7, in which the means for mounting said auxiliary support on said main support comprises a resilient member interconnecting said auxiliary support with said main support.

9. A device, according to claim 8, in which the means for maintaining said auxiliary support in altered relative angular relationship comprises a plurality of locating openings formed in said main support and locating pins carried by said auxiliary support and adapted for engagement with any selected locating opening.

NATHAN H. POLSKY.

References Cited in the file of this patent

UNITED STATES PATENTS

| Number | Name | Date |
|---|---|---|
| 999,945 | Aub | Aug. 8, 1911 |
| 1,648,942 | Hayman | Nov. 15, 1927 |
| 2,111,677 | Robinson | Mar. 22, 1938 |